US006880687B2

(12) United States Patent
Markyvech et al.

(10) Patent No.: US 6,880,687 B2
(45) Date of Patent: Apr. 19, 2005

(54) TRANSMISSION SYSTEM AND METHOD OF OPERATION TO ACCOMODATE ENGAGEMENT OF CENTRIFUGAL CLUTCH

(75) Inventors: Ronald K. Markyvech, Allen Park, MI (US); Daniel P. Janecke, Kalamazoo, MI (US); Donald D. Teadt, Vicksburg, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/449,639

(22) Filed: May 30, 2003

(65) Prior Publication Data

US 2004/0238305 A1 Dec. 2, 2004

(51) Int. Cl.[7] .............................................. B60K 41/24
(52) U.S. Cl. ............................. 192/13 R; 192/105 CP; 477/78; 477/96
(58) Field of Search ............................ 477/78, 71, 70, 477/96; 192/13 R, 3.63, 105 CP

(56) References Cited

U.S. PATENT DOCUMENTS

| | | | |
|---|---|---|---|
| 4,595,986 A | * | 6/1986 | Daubenspeck et al. ....... 477/78 |
| 4,930,081 A | * | 5/1990 | Dunkley et al. .............. 477/78 |
| 5,042,327 A | * | 8/1991 | Stainton ....................... 477/78 |
| 5,191,814 A | * | 3/1993 | Ando et al. .................. 477/125 |
| 5,577,978 A | * | 11/1996 | Stasik et al. .................. 477/78 |
| 5,620,391 A | * | 4/1997 | Wright ......................... 477/78 |
| 5,655,407 A | * | 8/1997 | Dresden et al. ............... 477/92 |
| 5,875,410 A | * | 2/1999 | Fowler et al. ................ 477/78 |
| 6,022,295 A | * | 2/2000 | Liu .............................. 477/78 |
| 6,702,713 B1 | * | 3/2004 | Edelen et al. ................. 477/78 |

* cited by examiner

Primary Examiner—Saul Rodriguez
(74) Attorney, Agent, or Firm—Rader, Fishman & Grauer PLLC

(57) ABSTRACT

A vehicular transmission system is disclosed that includes an engine, a transmission having an input shaft, a master friction clutch for drivingly connecting the engine to the transmission, an inertia brake for selectively controlling rotation of the input shaft, and at least one control unit. The control unit includes logic rules that selectively disable operation of the inertia brake in response to a system operating condition during at least one mode of operation of the vehicular transmission system. The system also includes at least one input corresponding to a system operating condition and at least one output corresponding to a command to log a fault or disable operation of the inertia brake in response to the system operating condition during the at least one mode of operation. A control system and method for operating the vehicular transmission system are also disclosed.

19 Claims, 7 Drawing Sheets

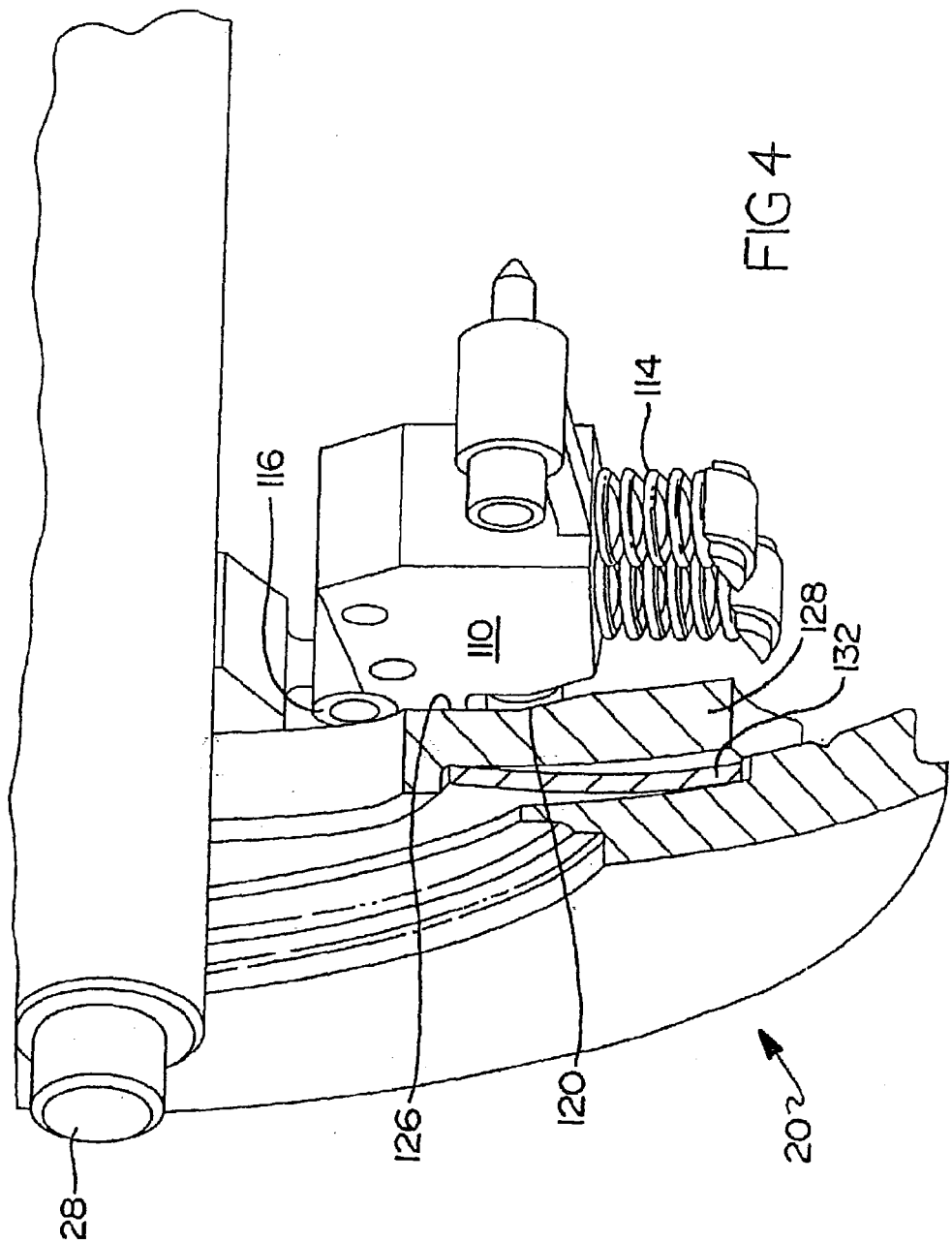

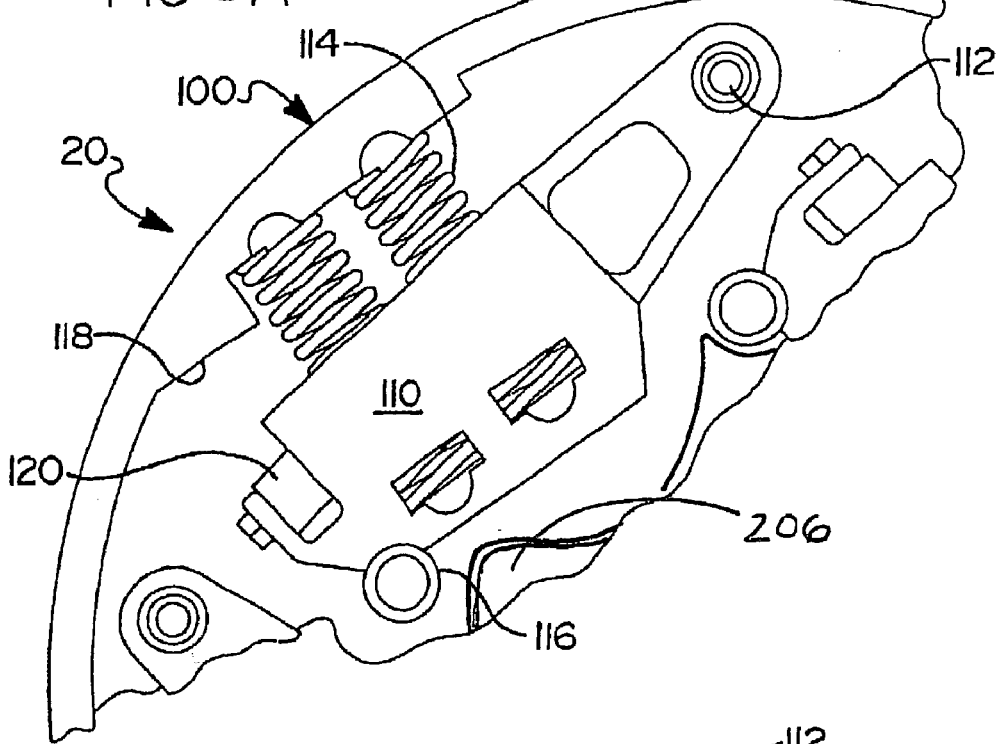
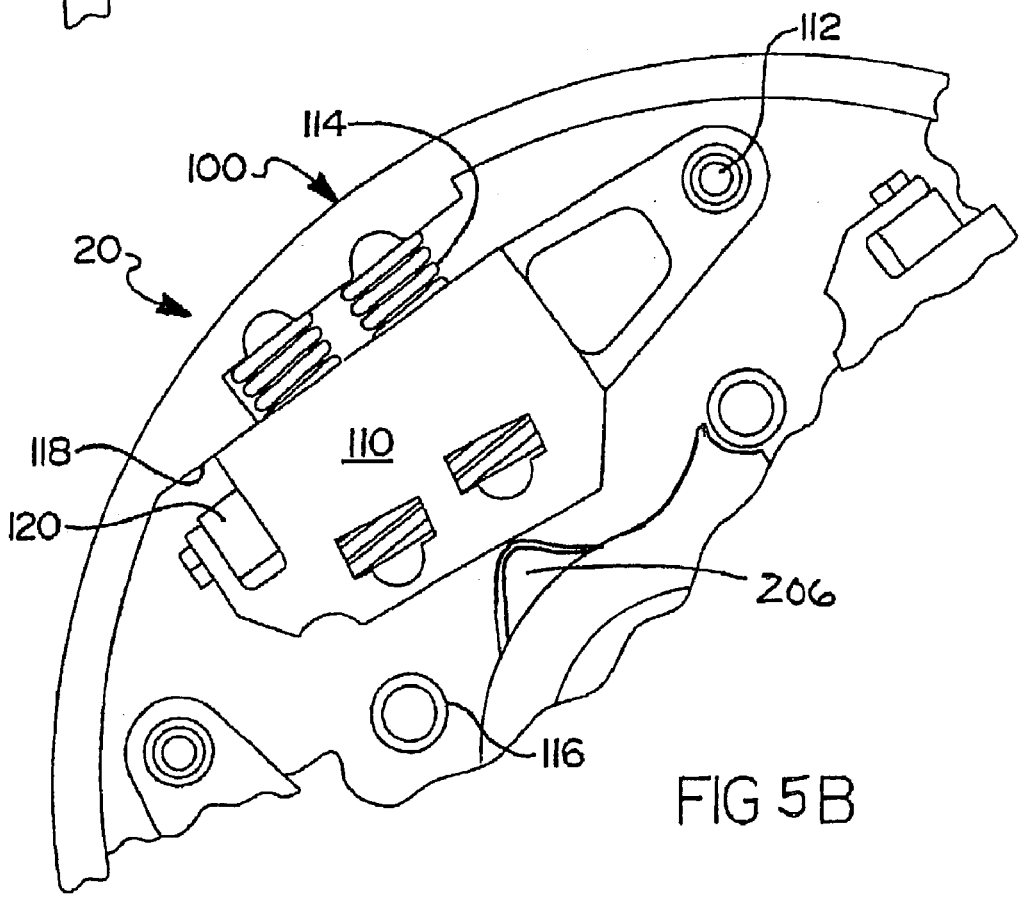

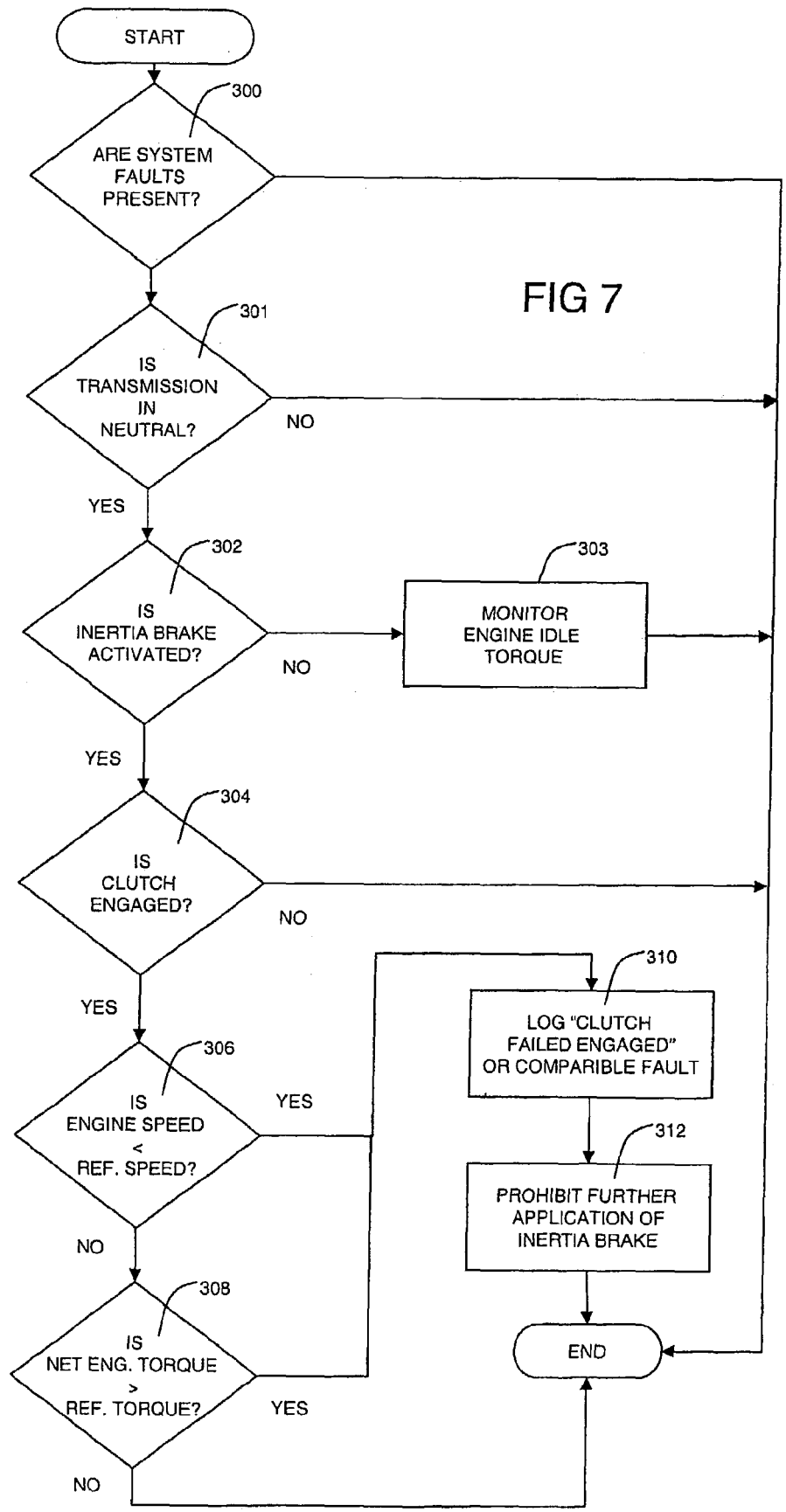

US 6,880,687 B2

TRANSMISSION SYSTEM AND METHOD OF OPERATION TO ACCOMODATE ENGAGEMENT OF CENTRIFUGAL CLUTCH

BACKGROUND OF THE INVENTION

1. Field of the Invention

The present invention relates to a vehicular transmission system including a master friction clutch and, in particular, to a vehicular transmission system and method for controlling operation of the transmission system as a function of system operating conditions.

2. Description of the Related Art

Vehicle transmission systems that include an internal combustion engine, a master friction clutch and a transmission are known in the art. A master friction clutch generally includes a cover assembly having a pressure plate, a cover and a diaphragm spring, all coupled for rotation together with an engine flywheel. A typical master friction clutch also includes at least one friction plate, commonly called a driven disc, having at its outer periphery friction pads and at its inner periphery a hub that is mounted on a driven member, such as a transmission input shaft. When the clutch is disengaged, the pressure plate is axially removed from the friction plate and no torque is transferred between the engine flywheel and the friction plate. When the clutch is engaged, the pressure plate applies a clamping force against the friction plate causing the engine flywheel and friction plate to contact and transfer torque therebetween.

Normally open (disengaged), centrifugally operated friction clutches are also well known in the art. Examples of centrifugally operated clutches may be seen by reference to U.S. Pat. Nos. 3,580,372; 3,580,372; 3,696,901; 5,437,356; 3,810,533; 4,819,779; 5,441,137; 5,730,269 and 4,610,343, the disclosures of which are incorporated herein by reference. Centrifugally operated clutches generally include an input member driven by an internal combustion engine and weights moveable with respect to the input member which, upon rotation of the input member, will move radially outwardly under the effect of centrifugal force to cause the input member to frictionally engage an output member. Centrifugal clutches dengage and disengage as a function of engine speed, requiring manipulation of engine speed to selectively engage and disengage the clutch.

Unlike a normally closed (engaged) clutch, the pressure plate in a normally open (disengaged) clutch does not exert a clamping force on the friction plate(s) until the clutch is engaged. Thus, an installation device is generally required to temporarily engage the clutch during installation into a vehicular transmission system. In one such system, the installation device selectively engages at least one of the clutch weights to force the weight to move radially outwardly causing the input member to engage the output member. Once the clutch is installed in the vehicular transmission system, the clutch is disengaged by operating the engine at a predetermined speed that allows the engaged weight to move further radially outward and disengage from the installation device. With the weight successfully disengaged from the installation device, the clutch and vehicular transmission system are ready for normal operation. However, failure to operate the engine at the predetermined engine speed after clutch installation may undesirably result in the clutch remaining engaged.

Vehicular transmission systems may also include an inertia brake, which functions to synchronize the rotation speed of the transmission input shaft with the speed of the transmission output shaft. When launching a vehicle, the inertia brake slows or stops rotation of the input shaft to allow the transmission to engage a low gear ratio (e.g., the staring gear ratio). Failure of the clutch to disengage, such as when the engine has not been operated at the predetermined engine speed after clutch installation, may damage an activated inertia brake and other components of the vehicular transmission system. Moreover, failure of the clutch to disengage may cause the engine to stall when the inertia brake is activated.

For these and other reasons, it is desirable to provide an improved approach for operating a vehicular transmission system, particularly those that employ a centrifugal master friction clutch, to reduce or minimize the known limitations of the prior art.

SUMMARY OF THE INVENTION

A vehicular transmission system is disclosed that includes an engine, a transmission having an input shaft, a master friction clutch for drivingly connecting the engine to the transmission, an inertia brake for selectively controlling rotation of the input shaft, and at least one control unit. The control unit includes logic rules that selectively disable operation of the inertia brake in response to a system operating condition during at least one mode of operation of the vehicular transmission system. The system also includes at least one input corresponding to a system operating condition and at least one output corresponding to a command to log a fault or disable operation of the inertia brake in response to the system operating condition. A control system and method for operating the vehicular transmission system are also disclosed.

BRIEF DESCRIPTION OF THE DRAWINGS

Embodiments of the invention will now be described, by way of example, with reference to the accompanying drawings, wherein:

FIG. 4 is a partial sectional view of the roller, ramp, and clamp force limiting spring mechanism utilized with the centrifugal mechanism of FIG. 3.

FIGS. 5A and 5B are partial sectional views of FIG. 3 illustrating the position of the flyweights in the fully radially inward clutch disengaged position and the fully radially outward clutch fully engaged position, respectively.

FIG. 7 is a schematic illustration, in flowchart format, of an embodiment of the control logic employed by the vehicular transmission system of FIG. 1.

DETAILED DESCRIPTION

Figure 1:
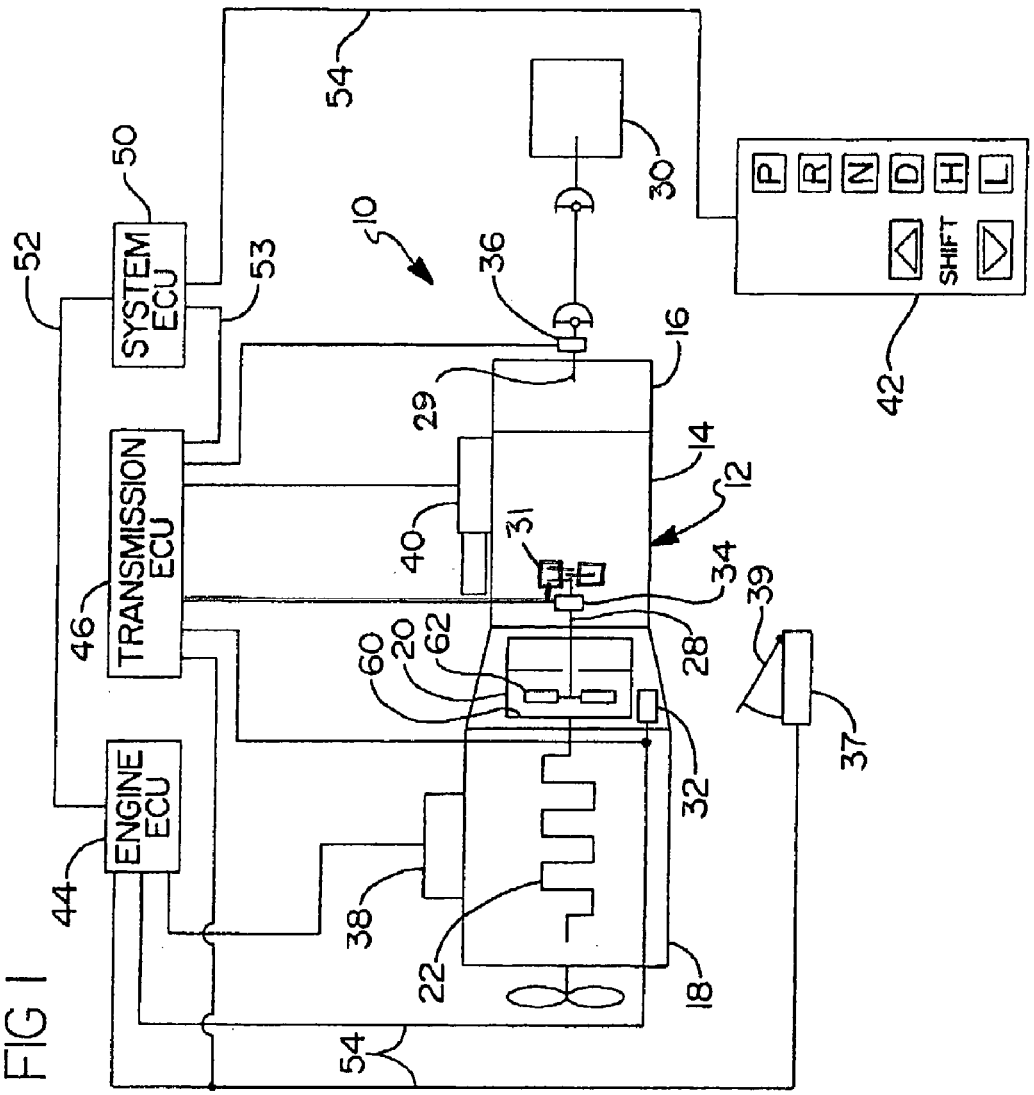
FIG. 1 is a schematic illustration of an exemplary vehicular automated transmission system employing the control system and method of the present invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms or configurations shown in the drawings and disclosed in the following detailed description.

An exemplary vehicular transmission system 10 using a centrifugally operated friction master clutch is schematically illustrated in FIG. 1. System 10 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735,771; and 6,015,366. The embodiment of vehicular transmission system 10 illustrated in FIG. 1 is provided by way of example only and is not intended to limit the scope of the claimed invention.

In the exemplary system 10, a change-gear transmission 12 including a main transmission section 14 connected in series with a splitter-type auxiliary transmission section 16 is drivingly connected to a prime mover 18 by an exemplary centrifugal master friction clutch 20. Transmissions 12, by way of example, may be of the type well known in the prior art and are sold by the assignee of this application, EATON CORPORATION, under the trademarks "Super-10" and "Lightning," and may be seen in greater detail by reference to U.S. Pat. Nos. 4,754,665; 6,015,366; 5,370,013; 5,974,906; and 5,974,354, the disclosures of which are incorporated herein by reference.

In an embodiment of the invention, prime mover 18 is a well-known gasoline or diesel internal combustion engine that includes a crankshaft 22, which is attached to a driving member 60 of centrifugal clutch 20. The driving member 60 frictionally engages with, and disengages from, a driven member 62, which is attached to the input shaft 28 of the transmission. A transmission output shaft 29 extends from the auxiliary transmission section 16 for driving connection to the vehicular drive wheels, as through a drive axle 30 or transfer case.

An inertia brake 31 (also known as an input shaft brake) may be used for selectively decelerating the rotational speed of input shaft 28. During launch or start gear selection and engagement, inertia brake 31 is activated to synchronize the speed of the input shaft 28 with the speed of output shaft 29, which is typically at rest when engagement of a starting gear ratio is attempted. Suitable inertia brakes for use in system 10 may be seen by reference to U.S. Pat. Nos. 5,655,407 and 5,713,445; however, inertia brake 31 is not intended to be limited thereto.

As shown in FIG. 1, centrifugal clutch 20 requires no external clutch actuator and is operated as function of the rotational speed (ES) of engine 18. Centrifugal clutch 20 also requires no connections to operating linkages, command signal inputs, power electronics and/or compressed air and/or hydraulic conduits. The most economical application of the present invention is with a dry clutch, however, the present invention is also applicable to wet clutch technology.

The exemplary system 10 may also include rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of the position of throttle pedal 39 or of torque demand. The signal is commonly expressed as a percentage (0% to 100%) of full throttle position. In an embodiment, engine 18 includes an electronically responsive engine controller 38.

An X-Y shift actuator 40, which by way of example may be of the types illustrated in U.S. Pat. Nos. 5,481,170; 5,281,902; 4,899,609 and 4,821,590, and may be provided for automated or shift-by-wire shifting of the transmission main section and/or auxiliary section. One exemplary actuator includes a pair of electrically operated motors or servos that shift the transmission through a mechanical interface. A shift selector 42 allows the vehicle driver to select a mode of operation and provides a signal $GR_T$ indicative of the gear ratio of the desired gear, or a Target Gear Ratio. The exemplary shift selector 42 shown in FIG. 1 has a plurality of gear range buttons which can be selected by the vehicle operator. Shift selector 42 could alternatively take other forms not illustrated, such as a shift lever having a shift knob. The lever could be toggled between positions corresponding to gear ranges.

Engine controller 38 and X-Y shift actuator 40 communicate through system 10 via an engine control unit 44, a transmission control unit 46 and a system control unit 50 (each shown in FIG. 1 as an electronic control unit or ECU). Engine ECU 44 and system ECU 50 may communicate with each other over a first multiplexed data bus 52 employing an appropriate communications protocol such as SAE J-1922, SAE J-1939, ISO 11898 datalink or the like. Transmission ECU 46 and system ECU 50 similarly communicate with each other over a second multiplexed data bus 53.

ECUs 44, 46 and 50 are preferably a microprocessor-based control unit of the type illustrated in U.S. Pat. Nos. 4,595,986 and 4,361,065, the disclosures of which are incorporated herein by reference. ECUs 44, 46, 50 receive input signals from throttle position sensor 50, speed sensors 32, 34 and 36 over conventional electrical signal and power conducting elements 54 such as wires. ECUs 44, 46, 50 process such signals according to predetermined logic rules to issue command output signals to system actuators, such as inertia brake 39, transmission 40, and the like, over conducting elements 54. ECUs 44, 46, 50 may also direct each other to issue command signals or otherwise function as a control system. ECUs 44, 46, 50 may function as three discrete devices or the function of each ECU may be incorporated into a single device. Similarly, ECU's 44 and 46 may be combined with engine controller 38 and transmission controller 40, respectively.

The structure of an exemplary centrifugal clutch may be seen by reference to FIGS. 3–6. In the illustrated embodiment, clutch 20 includes a cover assembly 100, friction disc assembly 102, intermediate pressure plate 104, and friction disc assembly 106. Cover assembly 100 and intermediate pressure plate 104 mount to the engine flywheel for rotation therewith and comprise the driving portion 60 of the clutch, friction disc assemblies 102 and 106 are typically splined to transmission input shaft 28 and comprise the driven portion 62 of the clutch.

Portion 20A of clutch 20 may be substantially similar, both structurally and functionally, to existing dual plate clutches. The cover assembly 100 includes four flyweights 110, which are pivoted to the housing assembly at pivot pins 112. Return springs 114 bias the flyweights 110 radially inwardly to rest on stops 116 (see, e.g., FIG. 5A). A stop member 118 limits the radially outward movement of the flyweights (see, e.g., FIG. 5B). As the engine and the housing 100 rotate, the effect of centrifugal force will cause the flyweights 110 to move against the bias of springs 114 from the position of FIG. 5A to the position of FIG. 5B. The flyweights 110 each carry one or more rollers 120 or functionally similar wedging member, which will act between a reaction surface and a ramp to provide an axial clamping force for engaging clutch 20.

Figure 6:
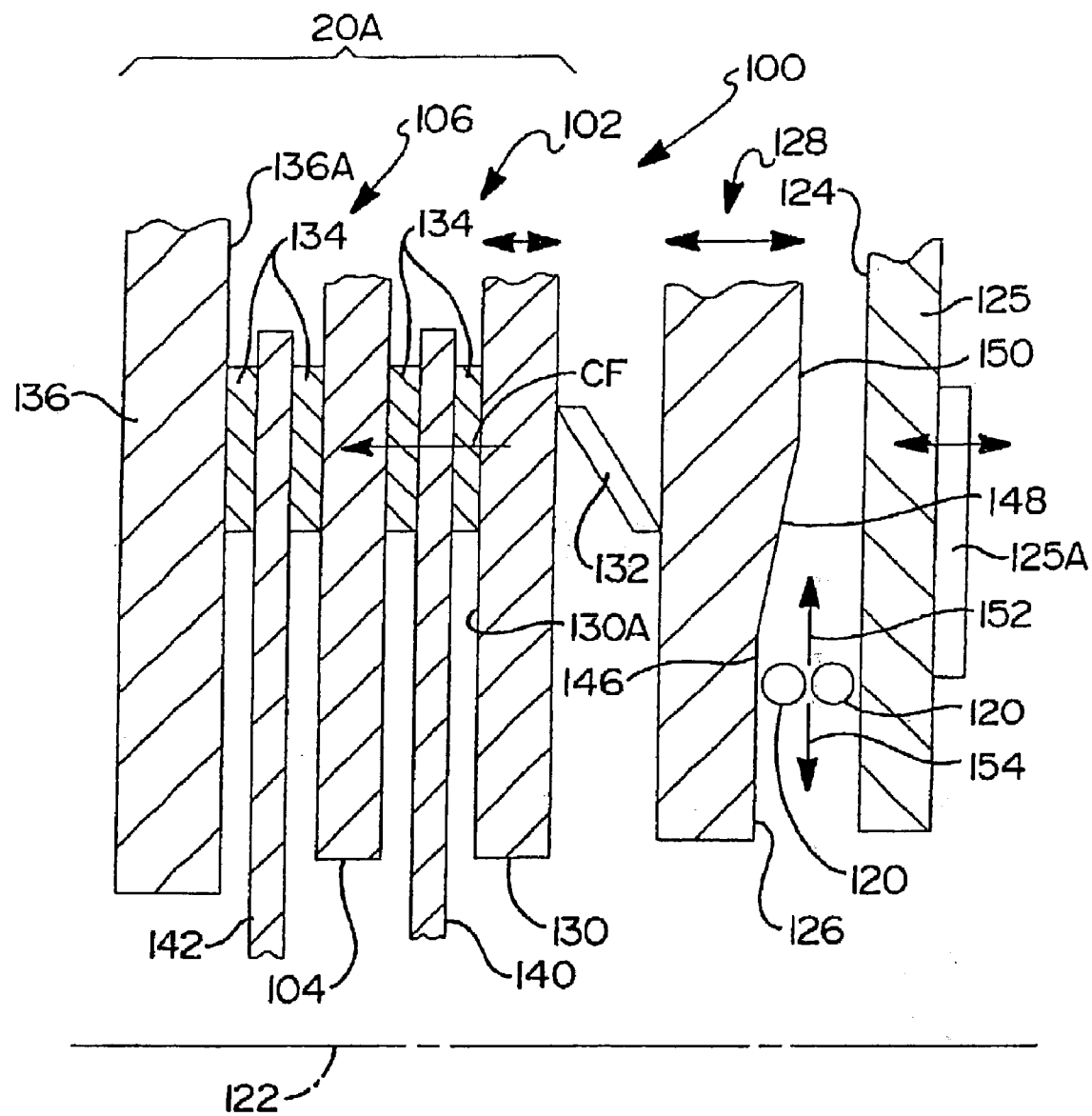
FIG. 6 is a schematic partial sectional view of various components of the exemplary vehicular automated transmission system of FIG. 1.

Referring to FIG. 6, the components of clutch 20 are shown in fragments as rotating about the rotational axis 122 of input shaft 28. Rollers 120 are received between a substantially flat surface 124 of a fixed reaction plate 125 and a ramped surface 126 of an axially movable ramp plate 128. Alternatively, surface 124 could be ramped and/or the wedging member could be of a wedge configuration. The reaction plate 125 may be manually and/or automatically adjustable by an adjustment mechanism 125A to take up wear or the like. The ramp plate acts on an axially movable main pressure plate 130 through a preloaded spring member 132, which will limit the axial force applied to the main pressure plate 130 by the ramp plate. Main pressure plate 130 will apply a clamping force (CF) on the friction pads 134 of the friction plates which are trapped between surface 130A of the main pressure plate 130 and the intermediate pressure plate 104 and the intermediate pressure plate 104 and surface 136A of the engine flywheel 136. The hub portions 140 and 142 of the friction plates 102 and 106, respectively, are adapted to be splined to input shaft 28 for rotation therewith while plates 125, 128, 130, and 104 rotate with engine flywheel 136.

Figure 2:
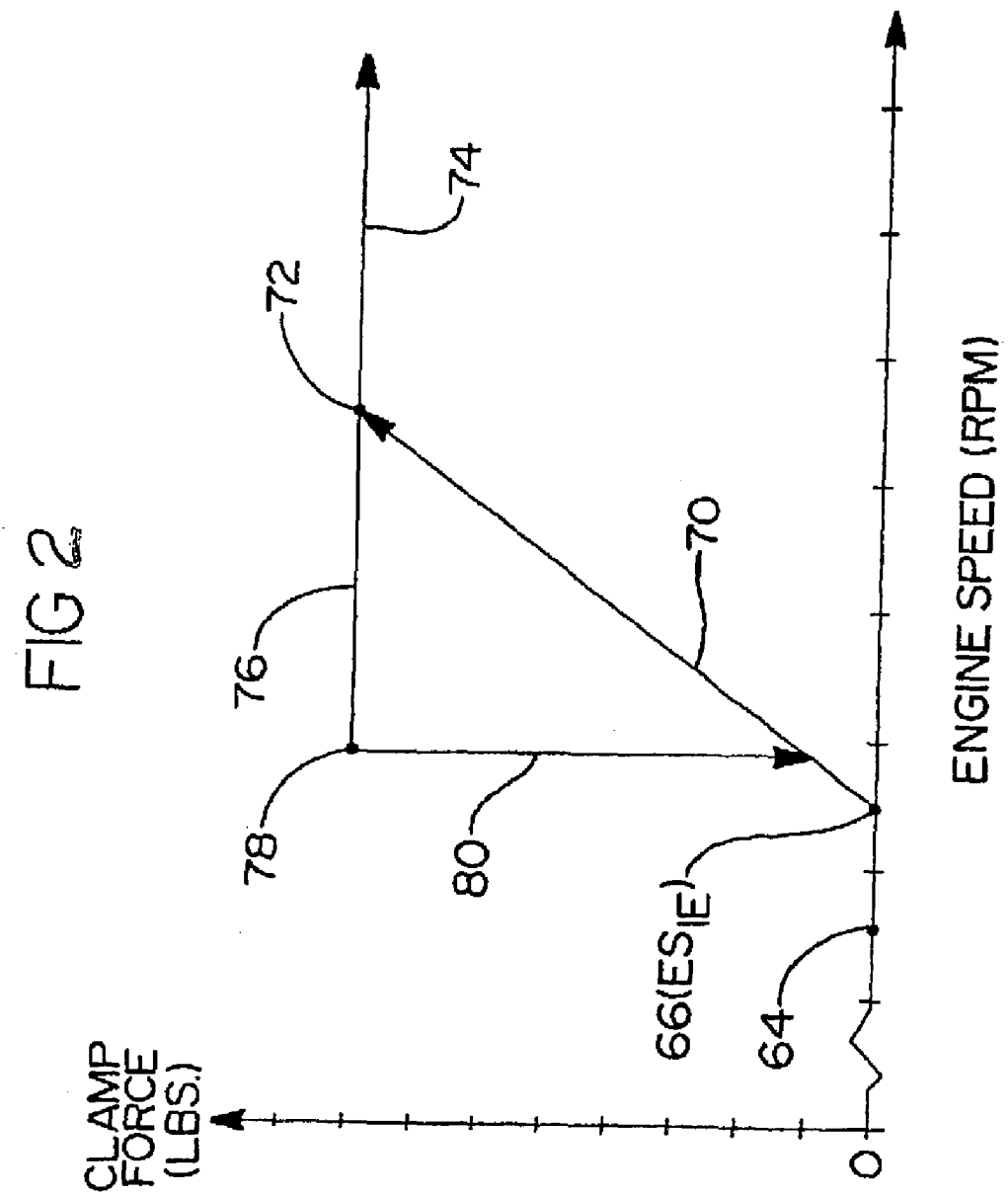
FIG. 2 is an exemplary schematic illustration, in graphical format, of the clamp force characteristics of an exemplary centrifugal clutch at various engine speeds.

Clutch 20 is disengaged at engine idle speed and becomes incipiently engaged at an incipient engagement engine speed greater than the engine idle speed. At rest, one of rollers 120 will engage the recessed portion 146 of surface 126 and will not apply a leftward axial clamping force to the friction pads. As the roller travels sufficiently radially outwardly, and onto the ramped portion 148 of the ramp surface 126, an increasing axial clamping force is applied (see, e.g., line 70 on FIG. 2). As the roller moves further radially outwardly onto the flat extended portion of 150 of surface 126, the clamp force will remain at a capped value (see, e.g., lines 74 and 76 of FIG. 2) as limited by preload spring 132. The flyweights 110 will hit stops 118 prior to full compression of springs 132.

A greater centrifugal force 152 is required to move rollers 120 up ramp portion 148 to flat portion 150 than is required to retain the rollers on the flat portion against the effect of spring force 154 from return springs 114. This accounts for the difference between the initial maximum clamp force engine RPM value, point 72 on FIG. 2, and the release engine RPM value, point 78 on FIG. 2. Back tapers and/or recesses may be added to surface 150 and/or the inclination of ramp 148 and/or flat portion 150, the relative masses and/or the spring rate of spring 114 may be modified to change the engine speed of disengagement, point 78 on FIG. 2.

As the speed of engine 18 significantly decreases, rollers travel radially inwardly down ramp portion 148 as flyweights pivot back into engagement with stops 116. When the engine approaches its idle speed, the clutch is fully disengaged. During operation of the vehicle, clutch 20 will typically disengage when the vehicle comes to rest, for example, when the vehicle is stopped at an intersection.

Referring again to FIG. 3, cover assembly 100 includes a clutch installation device 200. An example of a clutch installation device suitable for use in cover assembly 100 can be found in pending U.S. patent application Ser. No. 10/427,127, filed on Apr. 30, 2003, which is owned by the assignee of the present invention and is incorporated herein by reference in its entirety.

In an example embodiment, installation device 200 includes a spring-biased installation hub 202 that is rotatable relative to both cover assembly 100 and a stationary support hub 204. A torsion spring (not illustrated) is disposed between support hub 204 and installation hub 202 to rotationally bias installation hub 202 out of engagement with flyweights 110. Installation hub 202 includes at least one cam portion 206 that engages a flyweight 110 as installation hub 202 is rotated. When rotated, cam portion 206 will engage and move flyweight(s) 110 radially outward to provide an axial clamping force for engaging the master friction clutch 20.

Figure 3:
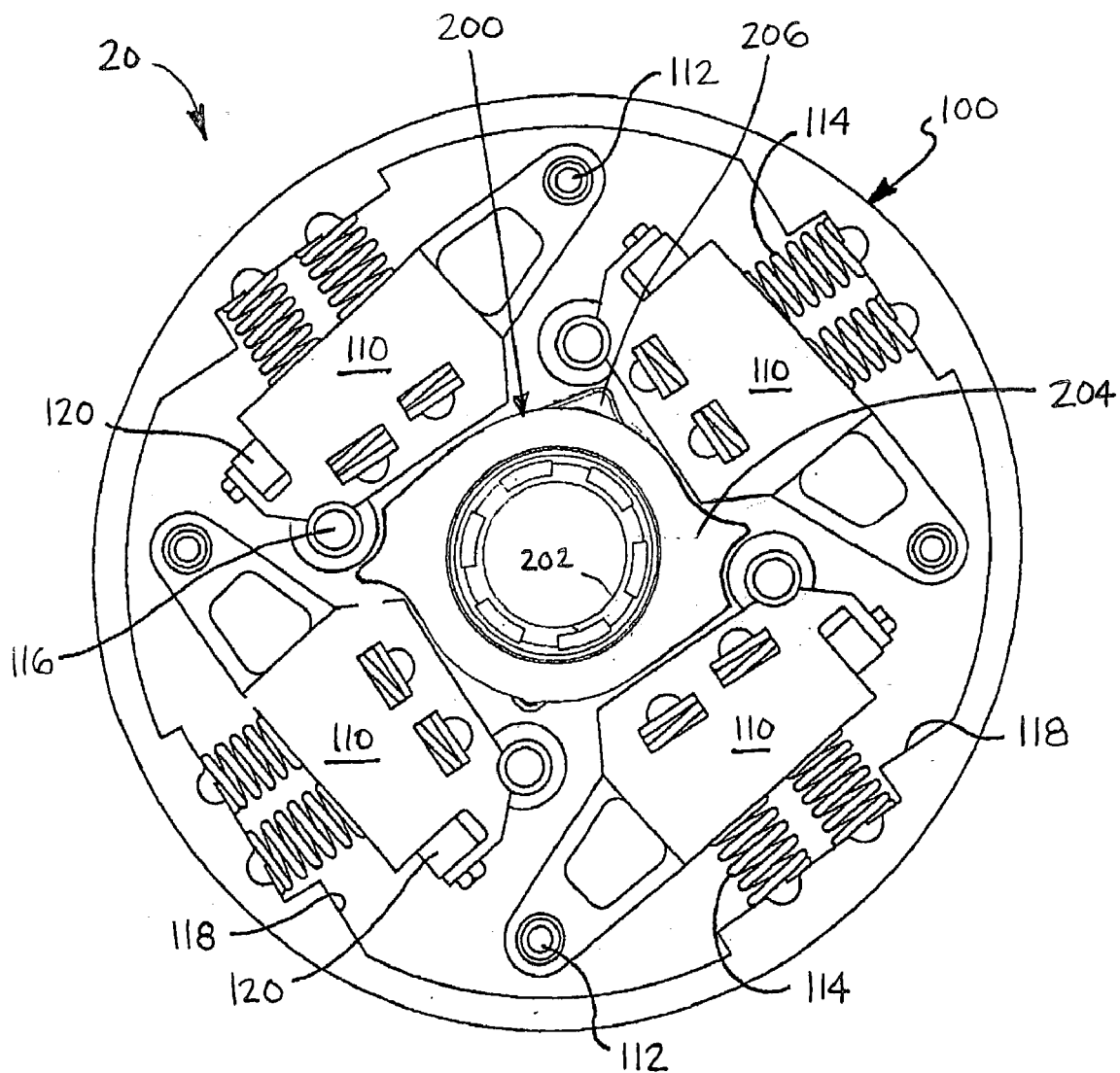
FIG. 3 is a partial top view, in section, of the cover, installation device and centrifugal mechanism of an exemplary centrifugal clutch.

In the embodiment illustrated in FIG. 3, cover assembly 100 is generally prepared for installation by rotating installation hub 202 into contact with a flyweight(s) 110 causing the engaged flyweight(s) to rotate outward against the biasing force of springs 114 (see, e.g., FIGS. 5A and 5B). As the engaged flyweight(s) 110 is rotated outward, roller 120 travels up ramp 148 forcing ramp plate 128, spring member 132, and pressure plate 130 to move away from clutch cover 125.

In preparation of securing cover assembly 100 to engine flywheel 136, friction plates 102, 106 are positioned adjacent to engine flywheel 136 using an installation shaft (not shown). Cover assembly 100 is then secured to flywheel 136 using a plurality of mounting bolts (not illustrated), as is generally known in the art. As the mounting bolts are tightened, cover assembly 100, and more particularly pressure plate 130, is drawn against the friction plates 102, 106 applying a clamping force (CF) through the compression of spring member 132. As described above, spring member 132 is compressed due to the position of ramp plate 128 caused by the outward rotation of the engaged flyweight(s) 110. After fully tightening all of the mounting bolts, the installation shaft may be removed allowing the clamping force (CF) applied by cover assembly 100, and more particularly pressure plate 130, to hold friction plates 102, 106 in their correct alignment position for receipt of transmission input shaft 28.

After transmission 22 is installed and engine 18 is capable of being started, clutch installation device 200 may be "unlocked" permitting use of the vehicle. To "unlock" installation device 200, a sufficient torque must applied to installation hub 202 and/or further outward rotation of the engaged flyweight(s) 110 is required. In an embodiment, engine 18 is started with transmission 22 in neutral and the engine speed (ES) is increased to a predetermined engine speed. The predetermined engine speed is based on factors, such as, for example, the biasing force of spring members 114 and the mass of flyweights 110, but is typically greater than engine idle speed. During the increase in engine speed, flyweights 110 rotate outward due to centrifugal force, separating the engaged flyweight(s) 110 from installation hub 202, permitting installation hub to rotate back to the position shown in FIGS. 3 and 5A.

Vehicular transmission system 10 may be configured to automatically shift the transmission from neutral into a low gear ratio, such as the starting gear ratio, to launch the vehicle. During low or starting gear engagement, engine 18 will be initially operating at or near its idle speed and clutch 20 will normally be disengaged. Additionally, as noted above, inertia brake 31 will be activated to synchronize the rotation speed of input shaft 28 with the speed of output shaft 29, which is not rotating when the vehicle is at rest.

Failure of clutch 20 to disengage when the vehicle is at rest permits engine 18 to transfer power to input shaft 28. Failure of clutch 20 to disengage may result from improperly operating the engine at a speed less than the predetermined engine speed during the clutch installation procedure described above, or for other reasons unrelated to clutch installation, such as a general failure of one or more clutch components to function as intended. Under these circumstances, prolonged activation of inertia brake 31 may cause engine 18 to stall and/or damage various components in system 10, including inertia brake 31.

When system 10 attempts to use inertia brake 31 to assist transmission 12 in shifting into a low gear ratio, such as the starting gear ratio, a diagnostic procedure will monitor at least one system operating condition and control operation of system 10 in response to the system operating condition. Referring to FIG. 7, control logic and a corresponding method for controlling system 10 according to an embodiment of the invention are schematically illustrated in flow-chart format. The order in which the control logic steps are executed is not intended to be limited to the order illustrated in FIG. 7. Moreover, one or more control logic steps may be consolidated into a single step or implied from another step.

In an embodiment of the invention, system ECU 50, either alone or in combination with engine ECU 44 and transmission ECU 46, will determine whether system faults (e.g., data link fault or input shaft speed sensor fault) are present (300). Because data used in evaluating system operating conditions, such as engine speed and input shaft speed, is used in the diagnostic program to control operation of system 10, a relevant system fault indicating a failure in the means for acquiring the data or an issue with the quality of the data itself may preclude further execution of the diagnostic procedure for reasons that will be understood below.

Optionally, a determination may be made as to whether transmission 12 is functioning in a predetermined mode of operation that warrants execution of the diagnostic procedure. For example, when a vehicle operator is attempting to engage a low or starting gear in anticipation of launching the vehicle, such as by actuation of shift selector 42, a determination may be made as to whether transmission is in neutral (301) or, alternatively, if the target gear ratio (e.g., starting gear ratio) is engaged.

Provided no relevant system faults are present and transmission is in neutral (or the target gear ratio is not engaged), a determination is made as to whether inertia brake 31 is activated (302). This determination may be made, for example, by monitoring commands issued by ECU. If inertia brake 31 is inactive, the control system continuously monitors system operating conditions, such as the engine idle torque, to provide a reference for future evaluation (303).

A determination is also made as to whether clutch 20 is engaged or disengaged (304). This determination can be made, for example, by evaluating the difference between engine rotational speed (ES) and input shaft rotational speed (IS), but is not necessarily limited thereto. The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement. However, the application of a minimal clamping force, perhaps cause by at least one of flyweights 110 remaining in an outward position even when the engine speed is below the speed permitting clutch disengagement, for example, may cause clutch 20 to operate in a partially engaged state (i.e., clutch slipping but transferring a certain amount of torque to input shaft 28).

If clutch 20 is operating in an engaged or partially engaged state, one or more system operating conditions are evaluated to determine the extent of clutch engagement. In an embodiment of the invention, with inertia brake 31 activated, ECU 50 alone or in combination with engine ECU 44 will determine whether the engine speed is generally less than a reference engine speed (306) or the net engine torque is generally greater than a reference engine torque (308). It is possible that activation of inertia brake 31 during the diagnostic procedure will provide a suitable counterforce to cause clutch 20 to disengage. However, if either one of the above conditions is satisfied, a fault code (e.g., "clutch failed engaged" or comparable fault code) is logged into a memory (310) and further application of inertia brake 31 is prohibited (312). Moreover, if clutch 20 fails to disengage, the driver may be appropriately notified of the vehicle's inoperability, such as by illuminating a service light in the vehicle instrument panel or conveying other suitable messages to the driver.

In a particular embodiment, a fault may be logged and further application of inertia brake 31 prohibited when the engine speed is less than the difference between the engine idle speed and a predetermined offset (e.g., $ES-ES_{IDLE}-100$ RPM) or when the net engine torque is greater than engine idle torque plus a predetermined offset (e.g., net_eng_tor > (idel_torque+200 lb-ft). The evaluation of these two conditions is particularly useful because the engine speed (ES) may drop below the idle speed when inertia brake 31 is activated and clutch 20 is engaged, or engine ECU 44 may control fueling of engine 18 to supply enough power (torque) to maintain the engine idle speed when inertia brake 31 is activated and clutch 20 is engaged. It will be appreciated that other system operating conditions indicative of clutch engagement status may also be evaluated in combination with or in place of the system operating conditions described above.

Because the engine's idle speed and idle torque are typically available over an engine data link, such as a SAE J1939 data link, it will also be appreciated that failure of the engine data link may provide inaccurate data or no data at all for evaluating the relevant system operating conditions. Therefore, detecting the presence of relevant system faults (300), such as an engine data link fault, prior to evaluating the relevant system operating condition ensures proper execution of the diagnostic procedure. Additionally, monitoring engine idle torque when inertia brake 31 is not activated (303) provides a reference value with which to compare and test for a high torque value (308).

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular transmission system comprising an engine, a transmission having an input shaft, a master friction clutch for drivingly connecting the engine to the transmission, an inertia brake for selectively controlling rotation of the input shaft, and at least one control unit for receiving an input and processing the input according to logic rules to issue an output to system components including at least the inertia brake, the system further characterized by:

the master friction clutch being a centrifugally operated clutch;

the control unit, in at least one mode of operation, selectively prohibits operation of the inertia brake;

at least one input corresponding to an engagement status of the master friction clutch;

the control unit including logic rules that control operation of the system in response to the engagement status of the master friction clutch; and at least one output corresponding to a command to log a fault or prohibit operation of the inertia brake in response to an engagement of the master friction clutch during the at least one mode of operation.

2. The system of claim 1, wherein the input corresponding to an engagement status of the master friction clutch includes at least one of engine speed and engine torque.

3. The system of claim 2, wherein the control unit issues the command output when the engine speed is generally less than a reference engine speed.

4. The system of claim 3, wherein the reference engine speed is less than an engine idle speed.

5. The system of claim 2, wherein the control unit issues the command output when the engine torque is generally greater than a reference engine torque.

6. The system of claim 5, wherein the reference engine torque is greater than an engine idle torque.

7. The system of claim 1, wherein the clutch includes a driving member rotatable with an engine output member and a driven member rotatable with the input shaft, the clutch having a degree of engagement dependent upon the rotational speed of the driving member, the clutch being disengaged at engine idle speed, the clutch becoming incipiently engaged at an incipient engagement engine speed greater than the engine idle speed.

8. A control system for a vehicular transmission system comprising an engine, a transmission having an input shaft, a master friction clutch for drivingly connecting the engine to the transmission and an inertia brake for selectively controlling rotation of the input shaft during at least one mode of operation of the vehicular transmission system, the control system including logic rules that:

determine an engagement status of the master friction clutch during the at least one mode of operation; and selectively log a fault indicating the clutch is engaged or prohibit operation of the inertia brake if the master friction clutch is engaged.

9. The system of claim 8 further including logic rules that:

determine if the engine speed is generally less than a reference engine speed;

log a fault indicating the clutch is engaged or prohibit operation of the inertia brake if the engine speed is generally less than the reference engine speed.

10. The system of claim 8 further including logic rules that:

determine if the clutch is engaged or disengaged;

determine if the engine speed is generally less than a reference engine speed;

log a fault indicating the clutch is engaged or prohibit operation of the inertia brake if the clutch is engaged and the engine speed is generally less than the reference engine speed.

11. The system of claim 8 further including logic rules that:

determine if the engine torque is generally greater than a reference engine torque; and log a fault indicating the clutch is engaged or prohibit operation of the inertia brake if the engine torque is generally greater than a reference engine torque.

12. The system of claim 8 further including logic rules that:

determine if the clutch is engaged or disengaged;

determine if the engine torque is generally greater than a reference engine torque; and log a fault indicating the clutch is engaged or prohibit operation of the inertia brake if the clutch is engaged and the engine torque is generally greater than a reference engine torque.

13. A control system for a vehicular transmission system comprising an engine, a transmission having an input shaft, a master friction clutch for drivingly connecting the engine to the transmission and an inertia brake for selectively controlling rotation of the input shaft during at least one mode of operation of the vehicular transmission system, the control system including logic rules that:

selectively activate the inertia brake during the at least one mode of operation;

determine if the clutch is engaged or disengaged; and log a fault indicating the clutch is engaged or prohibit further operation of the inertia brake if the clutch is engaged and the engine speed is less than a reference engine speed or engine torque is greater than a reference engine torque during the at least one mode of operation;

wherein an engine speed less than said reference engine speed or an engine torque greater than said reference engine toque during the at least one mode of operation indicates an undesirable engagement state of the clutch.

14. A method of operating a vehicular transmission system including an engine, a transmission having an input shaft, a master friction clutch for drivingly connecting the engine to the transmission and an inertia brake for selectively controlling rotation of the input shaft during at least one mode of operation of the vehicular transmission system, the method comprising:

determining if the master friction clutch is engaged or disengaged during the at least one mode of operation; and selectively logging a fault indicating the clutch is engaged and prohibiting operation of the inertia brake if the master friction clutch is engaged.

15. The method of claim 14 wherein determining if the master friction clutch is engaged or disengaged comprises:

determining if the engine speed is generally less than a reference engine speed; and prohibiting operation of the inertia brake if the engine speed is generally less than the reference engine speed.

16. The method of claim 14 wherein the steps are further defined by:

determining if the clutch is engaged or disengaged;

determining if the engine speed is generally less than a reference engine speed;

logging a fault indicating the clutch is engaged or prohibiting operation of the inertia brake if the clutch is engaged and the engine speed is generally less than the reference engine speed.

17. The method of claim 14 wherein the steps are further defined by:
  determining if the engine torque is generally greater than a reference engine torque; and
  prohibiting operation of the inertia brake if the engine torque is generally greater than a reference engine torque.

18. The method of claim 14 further including the steps of:
  determining if the clutch is engaged or disengaged;
  determining if the engine torque is generally greater than a reference engine torque; and
  logging a fault indicating the clutch is engaged or prohibiting operation of the inertia brake if the clutch is engaged and the engine torque is generally greater than a reference engine torque.

19. A method of operating a vehicular transmission system including an engine, a transmission having an input shaft, a master friction clutch for drivingly connecting the engine to the transmission and an inertia brake for selectively controlling rotation of the input shaft during at least one mode of operation of the vehicular transmission system, the method comprising:
  selectively activating the inertia brake during the at least one mode of operation;
  determining if the clutch is engaged or disengaged; and
  logging a fault indicating the clutch is engaged or prohibiting further operation of the inertia brake if engine speed is less than a reference engine speed or engine torque is greater than a reference engine torque during the at least one mode of operation;
  wherein an engine speed less than said reference engine speed or an engine torque greater than said reference engine toque during the at least one mode of operation indicates an undesirable engagement state of the clutch.

* * * * *

UNITED STATES PATENT AND TRADEMARK OFFICE
CERTIFICATE OF CORRECTION

| | |
|---|---|
| PATENT NO. | : 6,880,687 B2 |
| DATED | : April 19, 2005 |
| INVENTOR(S) | : Ronald K. Markyvech et al. |

It is certified that error appears in the above-identified patent and that said Letters Patent is hereby corrected as shown below:

<u>Column 10,</u>
Line 36, replace "toque" after "engine" with -- torque --.

<u>Column 12,</u>
Line 15, replace "toque" after "engine" with -- torque --.

Signed and Sealed this

Twelfth Day of July, 2005

JON W. DUDAS
*Director of the United States Patent and Trademark Office*